(12) United States Patent
Harrison, Jr. et al.

(10) Patent No.: US 6,696,986 B1
(45) Date of Patent: Feb. 24, 2004

(54) KEY PALETTE IMPROVEMENTS

(75) Inventors: Shelton E. Harrison, Jr., 530 Divisadero, #287, San Francisco, CA (US) 94117; Scott Pedersen, Sacramento, CA (US)

(73) Assignee: Shelton E. Harrison, Jr., Memphis, TN (US)

( * ) Notice: Subject to any disclaimer, the term of this patent is extended or adjusted under 35 U.S.C. 154(b) by 0 days.

(21) Appl. No.: 09/646,336

(22) PCT Filed: Mar. 16, 1999

(86) PCT No.: PCT/US99/05585

§ 371 (c)(1),
(2), (4) Date: Dec. 19, 2000

(87) PCT Pub. No.: WO99/47019

PCT Pub. Date: Sep. 23, 1999

Related U.S. Application Data

(60) Provisional application No. 60/078,202, filed on Mar. 16, 1998, and provisional application No. 60/093,179, filed on Jul. 17, 1998.

(51) Int. Cl.[7] ............................................. H03K 17/94
(52) U.S. Cl. ............................ 341/22; 341/20; 341/21; 345/169; 361/686; 224/219

(58) Field of Search .................................. 224/219–222, 224/267, 271, 272, 901.8, 930, 586; 439/37; 361/686, 680, 681; 341/20–22; 345/169; 455/350, 351; D3/218; 206/37, 38

(56) References Cited

U.S. PATENT DOCUMENTS

| | | | | | |
|---|---|---|---|---|---|
| 1,906,870 A | * | 5/1933 | Palla | ............................... | 42/94 |
| 2,854,132 A | * | 9/1958 | Bjerknes et al. | ............... | 206/37 |
| 3,060,625 A | * | 10/1962 | Glass et al. | ................. | 224/267 |
| 5,064,109 A | * | 11/1991 | Caster | ......................... | 224/267 |
| 5,183,193 A | * | 2/1993 | Brandell | ...................... | 224/219 |
| 5,579,969 A | * | 12/1996 | Brandell | ...................... | 224/277 |
| 5,764,164 A | * | 6/1998 | Cartabiano et al. | ........... | 341/22 |

* cited by examiner

Primary Examiner—Nathan J. Newhouse
(74) Attorney, Agent, or Firm—Steve Beyer

(57) ABSTRACT

An arm mounting mechanism comprising an arm wrap (11) which fits under the user's shirt sleeve and a cantilever shaft (13) which is attachable to a PDA or other device to be removably attached so that it rests over the user's sleeve. The mechanism may be used to mount display monitors, keyboards, bar code scanners, magnetic strip readers, GPS receivers, pagers, wireless phones, microphones and other electronic devices as well as non-electronic equipment such as clip-boards or tool racks.

32 Claims, 16 Drawing Sheets

KEY PALETTE IMPROVEMENTS

This application is a 371 of PCT/US99/05585 filed on Mar. 16, 1999 which claims benefit of U.S. Provisional Application No. 60/078,202 filed on Mar. 16, 1998 and U.S. Provisional Application No. 60/093,179 filed on Jul. 17, 1998.

BACKGROUND OF THE INVENTION

The disclosed invention pertains to body-worn computers, data entry devices, PDA's (personal digital assistants) and display monitors as well as other electronic and audio-visual equipment, such as wireless and cellular phones, cameras, microphones, bar-code scanners, remote controls and digitizing tablets. A primary object of the invention is to provide enhanced mobility to users of information technology.

The prior art described in the Key Palette patent application by Harrison, U.S. Pat No. 6,184,804, still represents the most relevant prior art with which we are familiar at this time, and we hereby incorporate those previous discussions by reference. While prior arm-wearable technologies afford users enhanced mobility, they are more obtrusive than ideal because most of them must fit over a user's sleeve, which is inconvenient for someone wearing a long-sleeve shirt or a jacket.

The original key palette disclosure by Harrison includes embodiments which provide under-sleeve phones, tape recorders and remote controls. The embodiments herein take the undersleeve concept a step farther by enabling under-sleeve mounting to be used in conjunction with larger display monitors which can also be used as a case for the electronic device it supports when said device is not in use.

SUMMARY OF THE INVENTION

The improved key palettes disclosed herein include generally three main features: (1) the user-accessed, interfaceable device (hereinafter, "IFD") which may be any of number of devices, including a display monitor, electronic keyboard, microphone, speaker, PDA (such as the 3Com Palm Pilot), pen-input digitizer or "pen tablet," magnetic strip reader, modem, cellular phone, bar-code scanner, or other device; (2) a cantilever mechanism; and (3) an arm-mounting mechanism. The arm-mounting mechanism typically includes an arm-wrap which fits directly around the user's forearm and is thin enough to fit under the user's shirt sleeve. This wrap is constructed of a breathable, flexible fabric so as to allow a comfortable but snug fit. Also typically included in this mechanism is a sheath which is attached to the arm-wrap and designed to accommodate the cantilever mechanism described below. The sheath and arm-wrap may be reinforced with another layer of material, such as a semi-flexible plastic, to lend extra stability to the arm-mounting mechanism.

The cantilever mechanism juts out of the wrist end of the sheath of the arm-mounting mechanism. Several different cantilever mechanisms are contemplated and disclosed. Which cantilever mechanism is preferable depends upon the use to which the unit as a whole will be put. Generally speaking, the cantilever mechanism is a U-shaped, rigid shaft which projects from the arm-attachment mechanism, curves around the end of the user s shirt sleeve, and then extends back over the user s forearm, where it serves as a rack upon which the IFD can be removably mounted.

The IFD includes a socket or slot which accommodates the cantilever mechanism so as to attach thereto. The attachment of the IFD and the cantilever mechanism may additionally incorporate one of a variety of joints, such as a ball-and-socket joint, thereby providing for additional freedom of movement of the IFD relative to the cantilever mechanism. Alternately, the IFD may mount upon a Velcro-covered plate which is in turn mounted upon the cantilever mechanism.

One alternative embodiment is the flip-over cantilever mechanism. This cantilever mechanism is collapsible and can be retracted into the arm-mount or IFD when not in use. It can then be pulled out when desired and flipped back over the user s sleeve where it serves to support the IFD as in other embodiments.

Another important variation is the T-stick cantilever mechanism. This device allows for rotation of the IFD around the user s arm by virtue of a curved track which is set on the end of an otherwise typical cantilever mechanism. Rotation around the user's arm is also achieved in the rotating pin cantilever mechanism and the collar cantilever mechanism.

In the Landing Gear cantilever mechanism, the cantilever shaft is actually built into an IFD so that it folds invisibly into the IFD when not in use. A spring-loaded version of this embedded cantilever mechanism is also disclosed.

A mechanism for mounting rollable or foldable displays is also shown. Since weight is an issue, we also disclose a computer cage which is lighter weight than a solid casing.

Another disclosed embodiment is that in which the arm-mounting mechanism also doubles as a case for the IFD. The case feature is achieved simply by wrapping the arm-mounting strap around the IFD in a manner which is similar to how this strap wraps around the user's arm when worn. In the example of PDA's ("Personal Digital Assistants" like the 3Com Palm Pilot), users typically already have a case in which their PDA's are carried when not in use.

The joint upon which the IFD swivels in the preferred embodiment is simply a rubber grommet which is squeezed between a plastic plate built into the arm-mounting strap and another plastic plate upon which the user-accessed device rests. While the preferred embodiment provides for a strap which folds over the user-accessed device in a vertical fashion, the same basic design can be used for horizontal fold-over.

The arm-mounting strap in one key alternative embodiment is threaded through the attached strap loop in such a way as to rest in ready-to-wear position.

DETAILED DESCRIPTION WITH REFERENCE TO DRAWINGS

Figure 1:
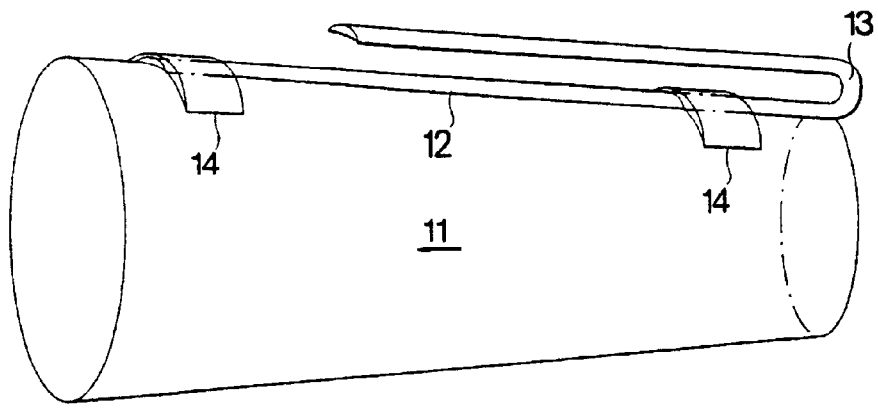
FIG. 1 shows the essential features of the key palette in side view.

FIG. 1 shows in side view the essential features of the simplest of the Key Palette improvements disclosed herein. The arm-wrap (11), constructed of a breathable, flexible fabric, fits snugly around the user's arm. Mounted on the surface of this arm-wrap is a sheath (12) which surrounds one prong of the U-shaped cantilever shaft (13). This sheath is stabilized by two epaulets (14). The arm-wrap attaches to itself around the user's arm by hook and loop fastener as in typical known removable arm braces. Enhanced stabilization of the sheath can be accomplished by providing additional ribs or epaulets which hold the sheath to the arm-mount more strictly. Such ribs may be of plastic or other somewhat bendable but non-stretchable material.

The IFD is not shown in FIG. 1, but is to be mounted upon the exposed prong of the cantilever shaft (13) by insertion of this prong into a sheath on the underside of the IFD. The shaft (13) may be removed from either or both sheaths. Instead of a sheath, a hook-and-loop fastener, a snap-together attachment mechanism or other means of attachment can be used to secure the IEFD to the exposed prong of the cantilever shaft. When a ball-and-socket joint is used in conjunction with the attachment of the user-accessed device to the exposed prong of the cantilever shaft, the IFD is thereby enabled to swivel and tilt with respect to the cantilever shaft and the arm-mounting mechanism as a whole.

The sheath is typically a sandwich of two aluminum or plastic slats which surround the shaft to be sheathed therein. This sheath is in turn sewn between an outer layer of leather and the arm-wrap to which it is to be attached.

Figure 2:
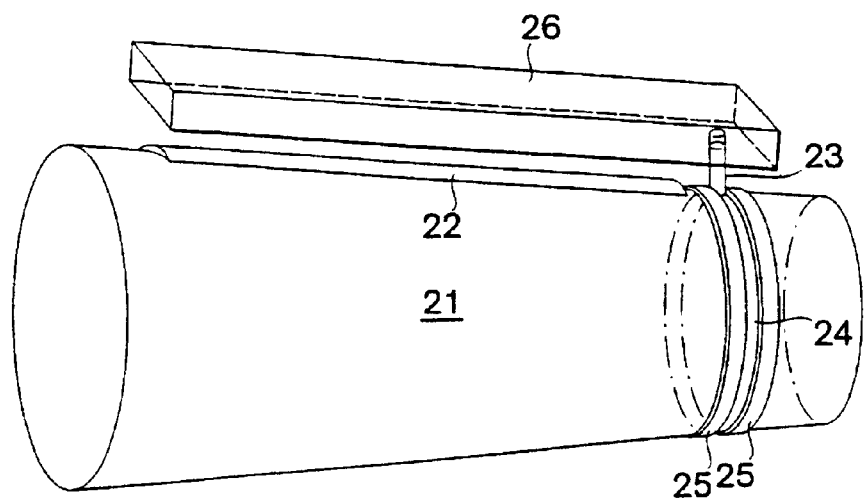
FIG. 2 shows another embodiment of the key palette in side view.

FIG. 2 shows in side view the essential features of another embodiment. This embodiment provides an arm-wrap (21), a sheath (22), and a cantilever pin (23) which is mounted upon a ring (24) within a collared ring (25). The IFD (26) is mounted upon the cantilever pin (23). The mechanism of concentric rings, one ring (24) which is held in place around a second ring (25) by collars, which mechanism allows for independent rotation of the two rings, is essentially like the double layer tube design of earlier key palettes. The benefit of this embodiment versus the one in FIG. 1 is that it allows the IFD to rotate around the user's arm without turning the whole arm-attachment mechanism. Alternately, the cantilever pin may be mounted so that it floats in a track or groove within a curved track, as in certain embodiments of the original Key Palette invention or in the T-stick mechanism described below.

Figure 3:
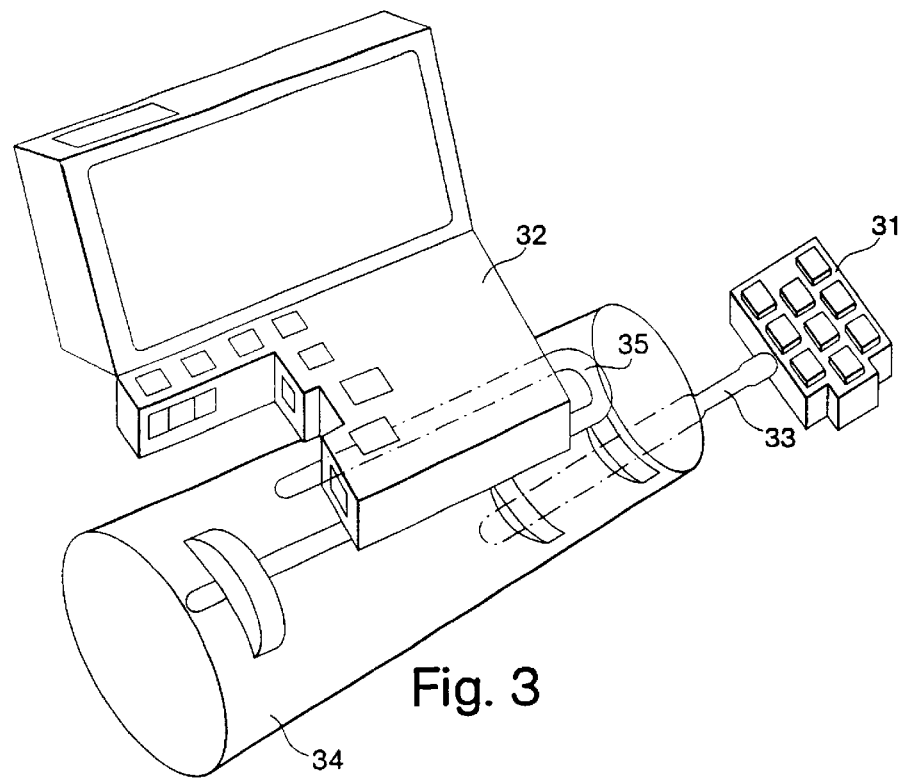
FIG. 3 shows an expandable key palette that is arm mounted.

FIG. 3 depicts an expandable key palette which has been arm-mounted. The handpiece (31) has been removed from the keyboard of the remainder of the key palette (32) and removably mounted upon a slightly angled cantilever shaft (33) on one side of the arm-attachment mechanism (34). The remainder of the key palette has been mounted on a U-shaped cantilever shaft (35) which is like the cantilever shaft (13) depicted in FIG. 1.

Figure 4:
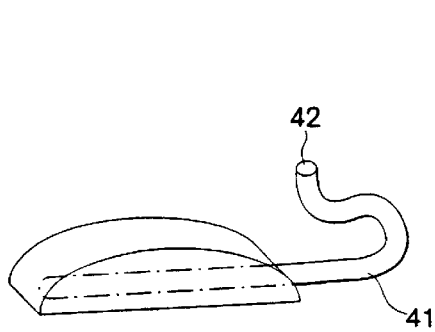
FIG. 4 shows a U-shaped cantilever shaft of one key palette.

FIG. 4 depicts a shortened U-shaped cantilever shaft (41) which curves upwards and terminates in a solid sphere (42). When the IFD (not shown) is mounted upon this sphere, which serves as the ball of a ball-and-socket joint, the IFD can swivel with respect to the user's arm by virtue of this joint.

Figure 5:
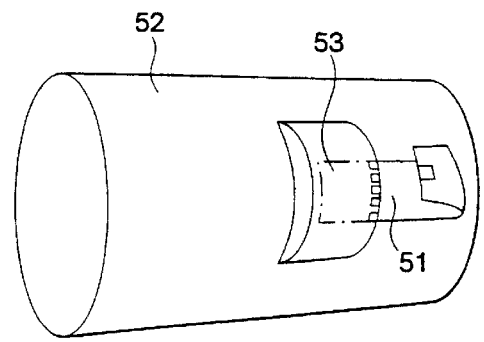
FIG. 5 shows a shortened cantilever shaft on an arm mount.

FIG. 5 depicts a shortened cantilever shaft (51) mounted upon an arm-attachment mechanism (52) with sheath (53).

Figure 6A:
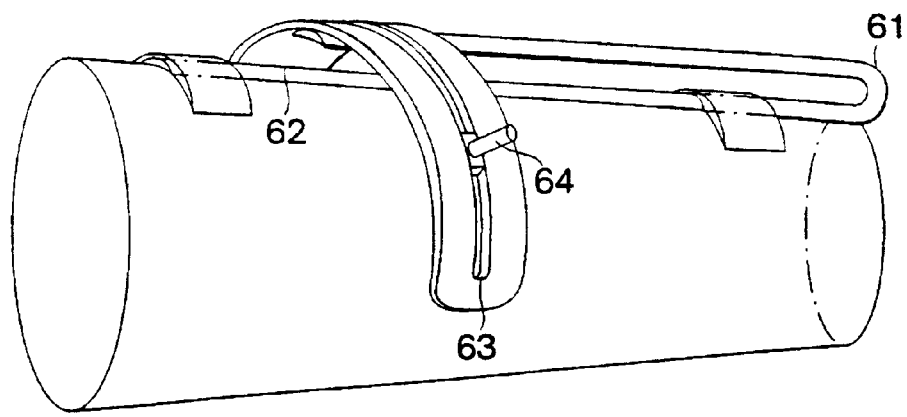
FIG. 6A shows a T-stick cantilever mechanism.

FIG. 6A depicts a T-stick cantilever mechanism. This mechanism provides a normal U-shaped cantilever shaft (61) of which one end (62) is a shaft portion which is perpendicular to the remainder of the cantilever shaft. This crossbar portion (62), which makes the exposed portion of the cantilever mechanism resemble a capital T, is curved so as partially to encircle the user's forearm. This crossbar portion (62) is fitted with a track groove (63) in which a pin (64) which supports the IFD is set so that this pin can travel back and forth along the prescribed path. On some embodiments, the crossbar provides a concave pad projecting from the surface which faces toward the user's arm; this pad rests against the user's forearm when the IFD is in detente position (i.e., when it is running parallel to the user's forearm).

Figure 6B:
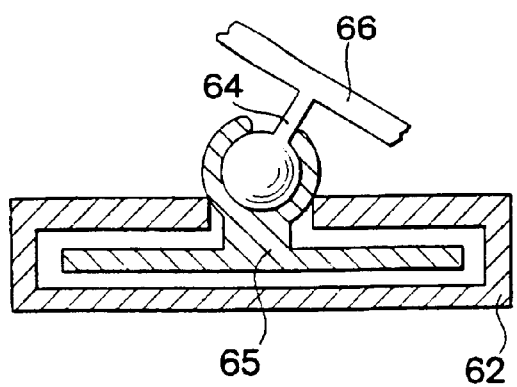
FIG. 6B shows the cross-section of the T-stick cantilever mechanism.

FIG. 6B depicts a cross section of the crossbar of a T-stick cantilever mechanism. The crossbar track itself (62) encircles the pin (64) upon which the IFD (66) is to be mounted (this device has been cut away in the drawing). The pin (64) terminates in a ball which is mounted in a socket protruding from the pedestal (65) which rests in the track described by the crossbar (62).

Figure 7A:
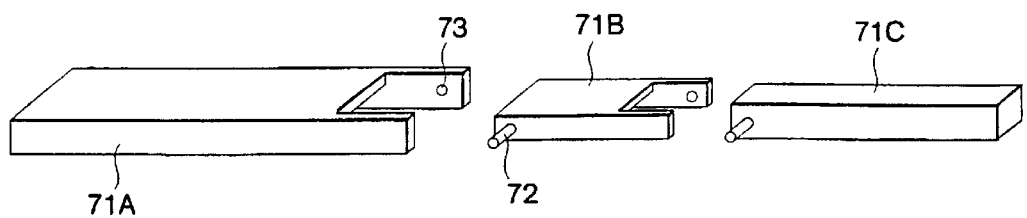
FIG. 7A shows a flip-over cantilever mechanism in pieces.

FIG. 7A depicts a flip-over cantilever mechanism. This flip-over cantilever mechanism is collapsible and expandable by virtue of its being constructed in three interlocking, hinged parts (71a, 71b and 71c). Interlocking and hinging so as to be collapsible can be achieved by a variety of known means, of which one is depicted. In the depicted version, the external shaft segment (71c) fits inside the middle segment (71b) which in turn fits inside the base segment (71a). This base segment remains immobilely housed inside a sheath on the arm-mounting mechanism but can be removed from this sheath when the arm-mount is to be washed, etc. Braking means can be attached to the joints of the flip-over cantilever mechanism so that it can be locked in place when in use. A rounded, spring-loaded pin (72) protrudes from either side of the two external shaft segments; this pin rides in a groove when the unit is in motion (i.e., being expanded or compressed) and then snaps into a socket (73) when the unit reaches full extension. This socket and pin form the joint upon which the shaft segments pivot.

Figure 7B:
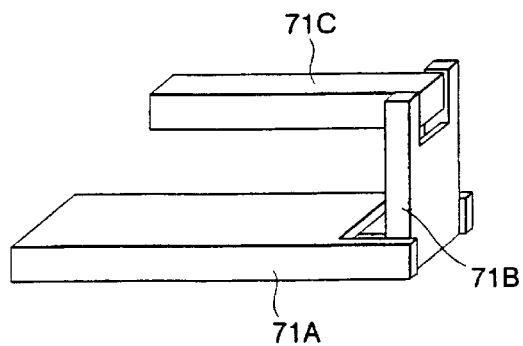
FIG. 7B shows the flip-over cantilever mechanism in perspective in the fully extended and flipped back over position.

FIG. 7B depicts the flip-over cantilever mechanism in perspective view after it has been fully extended and flipped back over so as to resemble in shape a typical U-shaped cantilever shaft. The base segment (71a) is ready to be inserted into a sheath on an arm-mounting mechanism, while the external segment (71c) is ready to serve as a rack upon which to mount a IFD, as in other models. Alternately, this same design can be used in a model in which the external shaft segment (71c) itself is a pager, cell phone or other device which the user would like to access or view.

Figure 8:
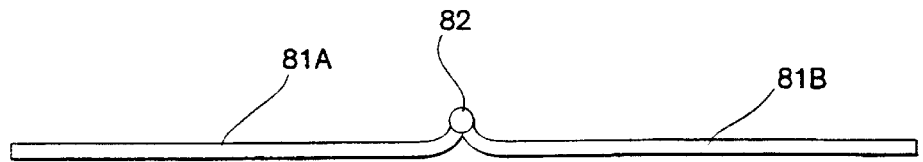
FIG. 8 shows a two-piece flip-over cantilever mechanism.

FIG. 8 depicts a two piece instead of three-piece flip-over cantilever mechanism, which consists of two shafts (81a and 81b) which are curved at the ends by which they are connected by a joint (82). This curve allows the two shafts to form a U shape as in other cantilever mechanisms when they are closed in towards one another.

Figure 9A:
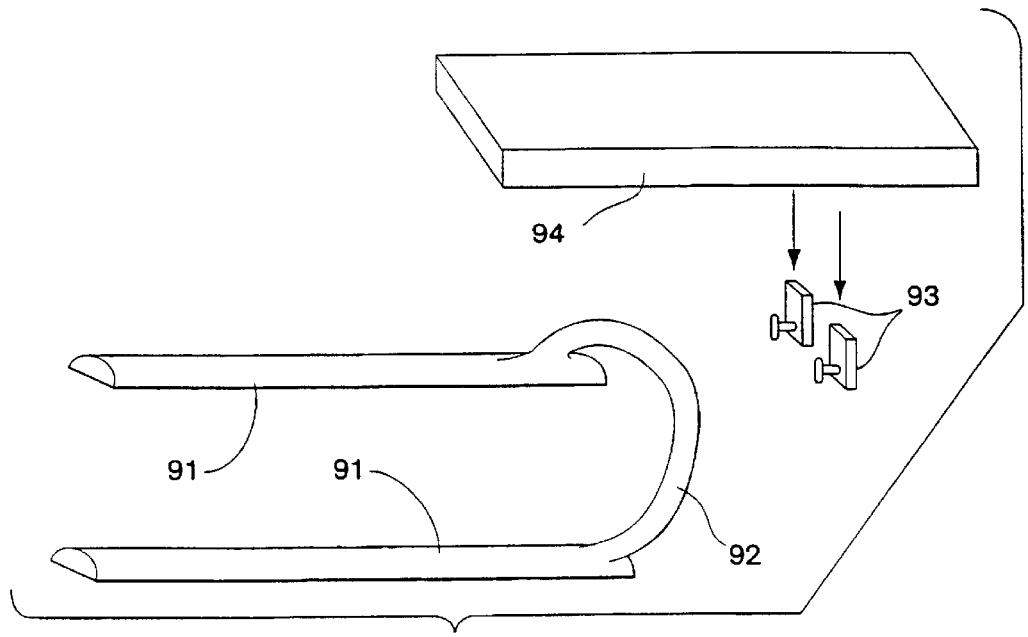
FIG. 9A shows a collar cantilever mechanism.

FIG. 9A shows the collar cantilever mechanism. In this model, two stabilizing shafts (91) are attached to a rigid cantilever track (92) which is shaped roughly like a semicircle. Two legs (93) fit into grooves on this track so that they can travel back and forth along the path prescribed thereby. The user IFD (94) is then mounted on these legs. The two stabilizing shafts (91) fit into sheaths on an arm-attachment mechanism as in former embodiments.

Figure 9B:
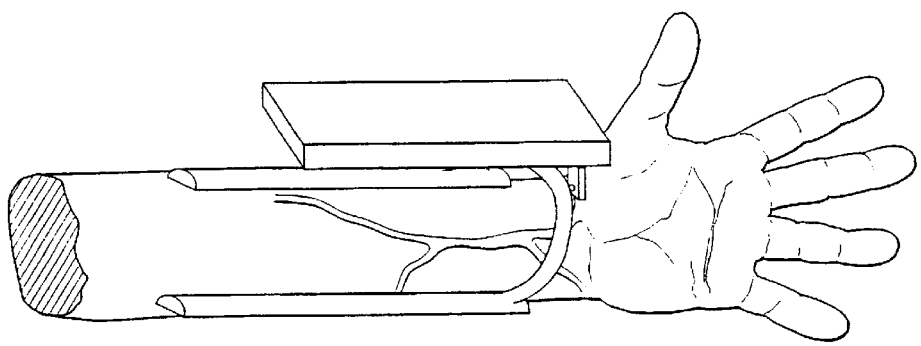
FIG. 9B shows the collar cantilever mechanism in use.

FIG. 9B demonstrates the unit depicted in FIG. 9A in use. The landing gear cantilever mechanism works as depicted in several alternative embodiments.

Figure 10A:
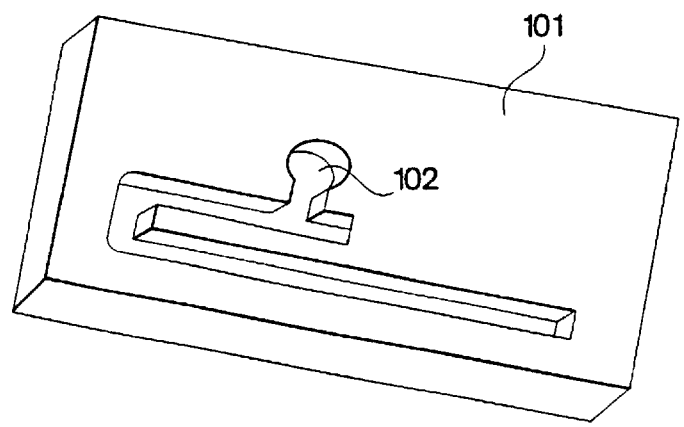
FIG. 10A shows the back of a PDA or personal digital assistant.

FIG. 10A depicts the back of a PDA or personal digital assistant (101) the shell of which includes a hollow trough (102) which is shaped so as to accommodate a special version of the U-shaped cantilever shaft. The electronics of this PDA are housed in other areas of the casing so as to make room for this trough on the back of the PDA's shell.

Figure 10B:
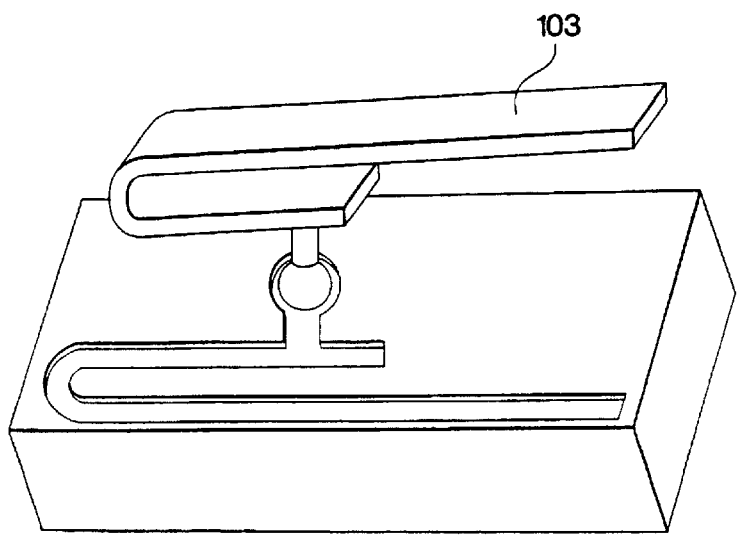
FIG. 10B shows the PDA with special built in shaft attached.

FIG. 10B depicts the special built-in shaft (103) as it projects from the back of the PDA, to which it is connected by ball-and-socket joint. When the PDA is to be used as an arm-mounted device, this shaft is simply inserted into the arm-mount as in other models. However, when the PDA is not to be used in arm-mounted fashion, the cantilever shaft (103) folds down into its trough so that no portion of the shaft breaks the back plane surface of the unit; thus the PDA can rest stably on its back without any interference from the shaft when it is tucked away.

Figure 10C:
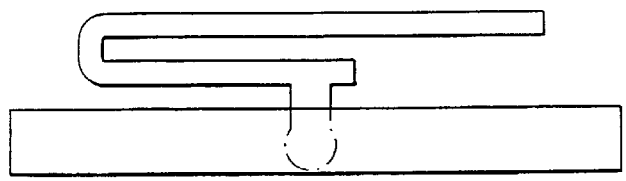
FIG. 10C is the side view of FIG. 10B.
Figure 10D:
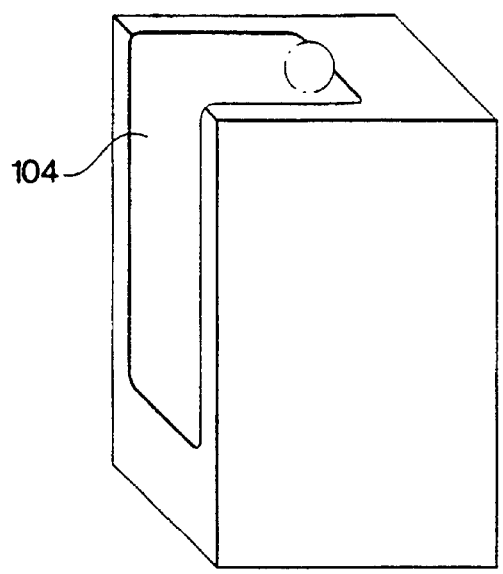
FIG. 10D shows the PDA with the shaft attached to the end of the PDA.
Figure 10E:
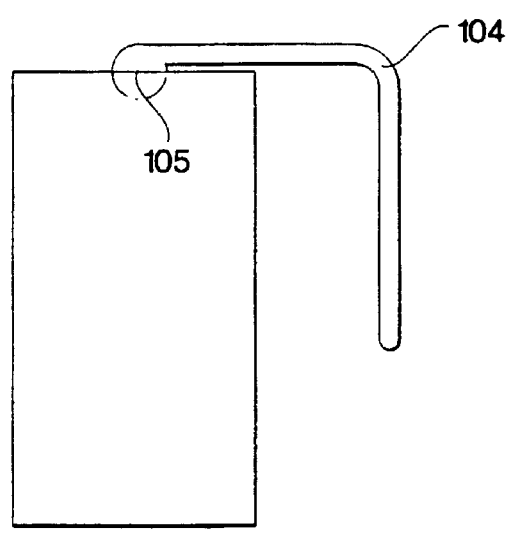
FIG. 10E is the side view of FIG. 10D.

FIG. 10C shows the PDA in side view when the cantilever shaft is deployed for arm-mounting of the unit. An L-shaped cantilever shaft (104) can also be attached to the end of the PDA by a swiveling joint (105) and fold-out as depicted in FIGS. 10D and 10E. Previously depicted embodiments have typically relied upon ball-and-socket joints to enable the swiveling and tilting features of the invention.

Figure 11A:
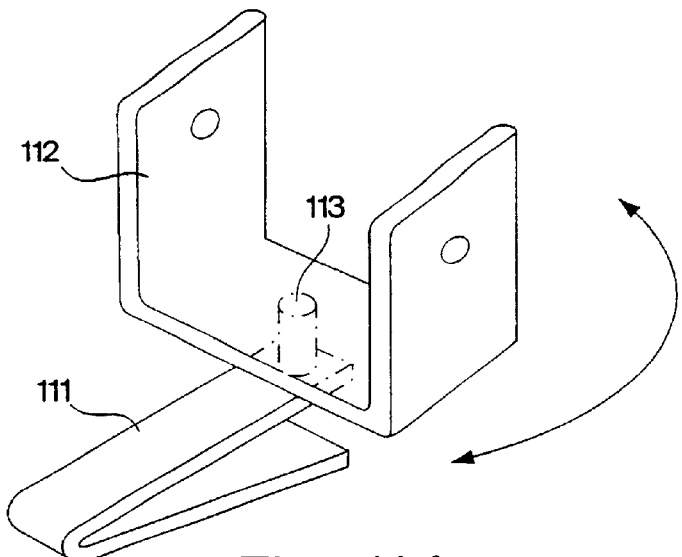
FIG. 11A shows a cantilever shaft and cradle mount.

In FIG. 11A, swiveling and tilting have been separated as functional elements. The depicted U-shaped cantilever shaft (111) is fitted with a cradle mount (112); the two are attached by a small lazy susan joint (113) that enables the cradle mount (112) to swivel with respect to the cantilever shaft (111).

Figure 11B:
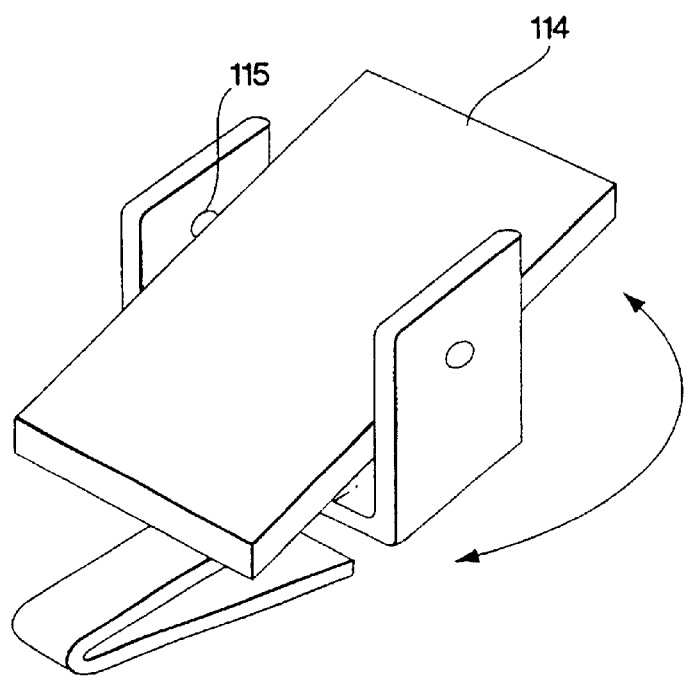
FIG. 11B shows the cantilever shaft and cradle mount with a PDA attached.

FIG. 11B depicts a PDA (114) which has been suspended by pins (115) in between the two prongs of the cradle mount so that it can tilt back and forth. Alternately, a tray (not pictured) can be mounted as the PDA is mounted in FIG. 11B wherein this tray is equipped with a variable cinching mechanism that accommodates different sizes and shapes of PDAs, thereby allowing a single cradle mount with such a tray to hold a variety of different PDAs.

Also not pictured is a U-shaped cantilever shaft upon which a tilting monitor as depicted in the first Key Palette patent documents is mounted. This embodiment would similarly allow separation of the tilting and swiveling functions, since the case of the tilting monitor could be mounted to the cantilever shaft by way of lazy susan joint.

Figure 12A:
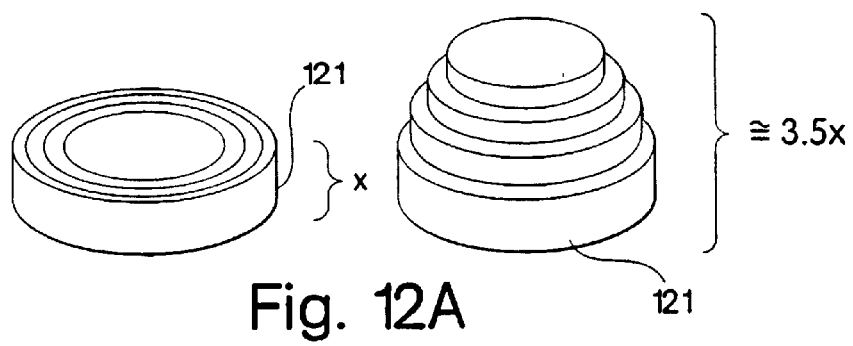
FIGS. 12A–12I show a spring-loaded cantilever mechanism.
Figure 12B:
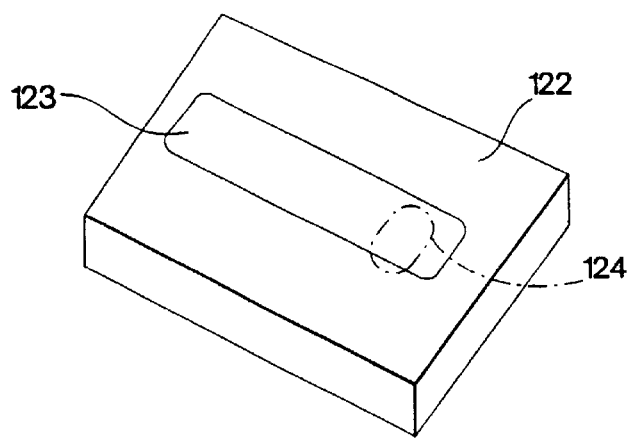
Figure 12C:
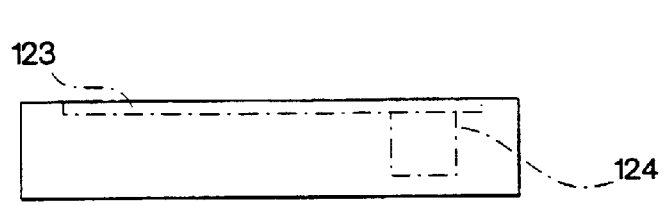
Figure 12D:
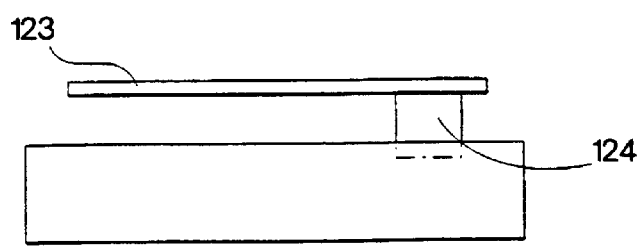

FIGS. 12A through 12I disclose a spring-loaded variation of the cantilever mechanism. First, FIG. 12A depicts a collapsible tube (121) in two different positions, compressed and expanded. This tube is designed like known collapsible cups or antennas as a series of concentric, hollow cylinders that fit inside one another and can move with respect to one another so as to form an expanded tube when desired. FIG. 12B depicts the back of a PDA (122) in which a cantilever mechanism is set; the PDA's display (not visible) is in the front of the unit. The portion (123) of the cantilever shaft which is to be inserted in the sheath of the arm-mounting mechanism is visible; it rests in the plane of the back of the PDA so that this PDA can rest on its back side stably and appears to be a standard PDA. The visible portion (123) of the cantilever mechanism is mounted to the PDA on a pedestal (124) which is a collapsible tube, which is spring-loaded so that it expands to its maximum height when a catch mechanism is released (by manual switch, lever, etc.). FIG. 12C shows this PDA in side view, as the position of the pedestal (124) is more easily viewed from this angle. The expansion of this collapsible pedestal projects the entire cantilever mechanism out away from the PDA, as shown in FIG. 12D so that the unit as a whole is ready to be arm-mounted by insertion of the shaft (123) into the sheath of an arm-mounting mechanism. The collapsible tube may also be replaced simply by a solid (non-collapsible) pedestal which is mounted on a spring that pushes the entire pedestal out when a catch is released as above.

Figure 12E:
Figure 12F:
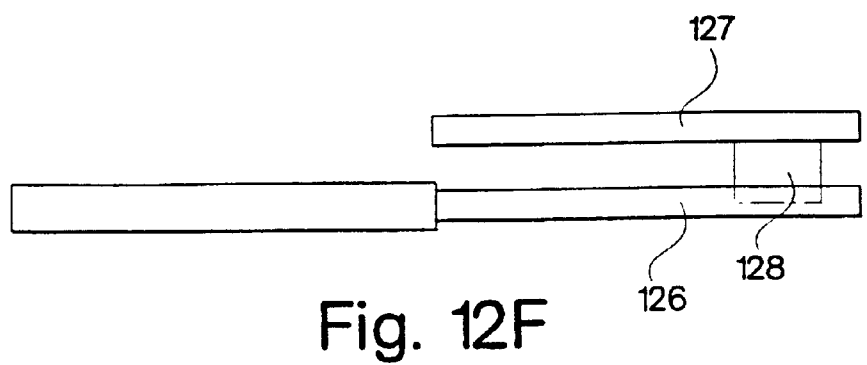
Figure 12G:
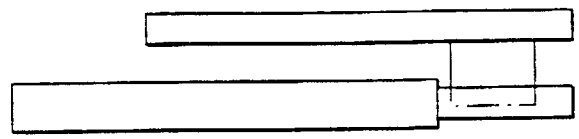
Figure 12H:
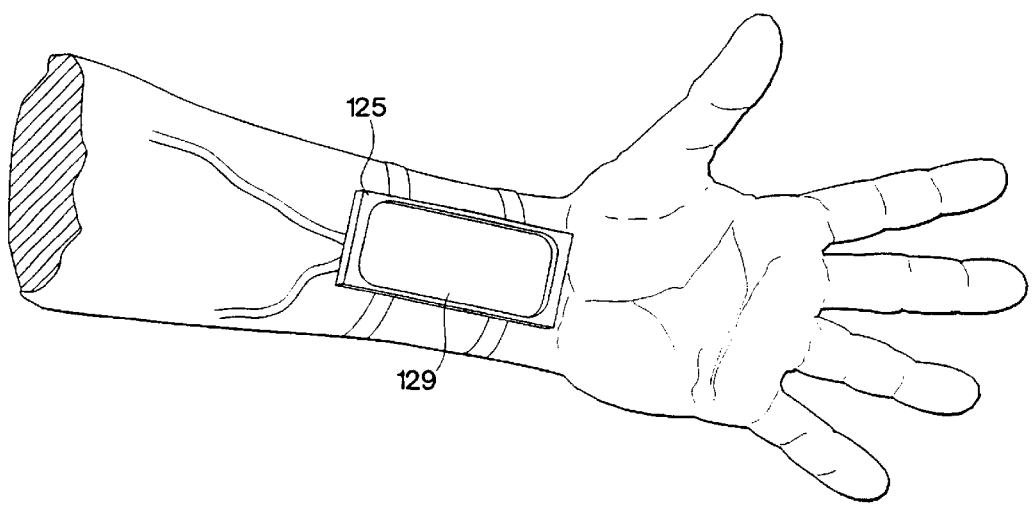
Figure 12I:
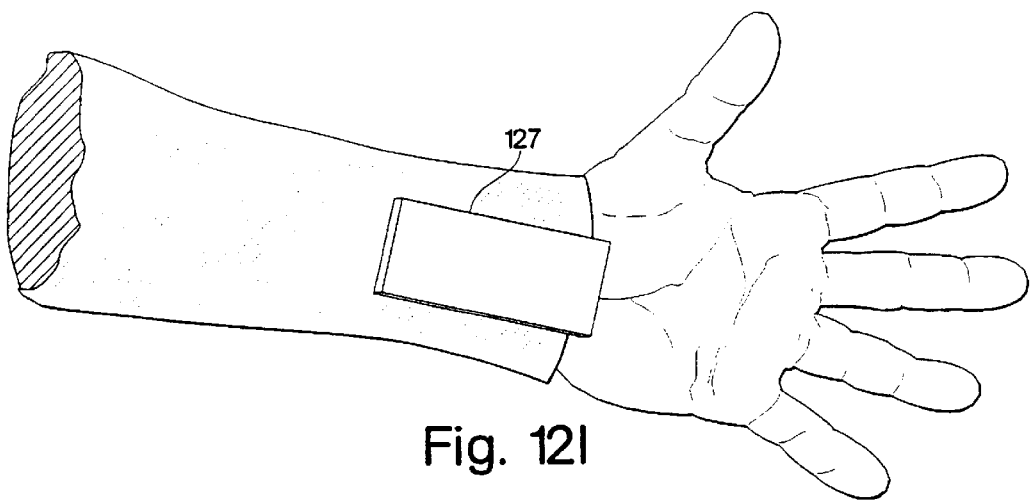

FIGS. 12E, 12F and 12G show in side view a variation of the spring-loaded mechanism which is particularly suited to very small electronic devices, such as a Rex PC Companion or a pager. In this device, a housing (125) is mounted against the forearm of the user as in the arm-mounted under-sleeve phones of the original Key Palette invention by Harrison. Out of this housing, a tray (126) pops out upon demand of the user (either by action of spring-loading and release of a catch mechanism or simply by the user's pulling the tray out manually). Set in this tray is a display-bearing device (127)—i.e., a pager, a Rex PC Companion, etc.—which is spring-loaded in a way which is similar to the spring-loaded PDA above. By action of this second spring (128), the display-bearing device (127) is projected out of the tray when the catch mechanism on the spring mechanism is released; this action is typically done automatically when the display-bearing device clears the confines of the housing. When the tray is collapsed back into the housing from whence it came, as shown in FIG. 12G, the display remains visible and can rest over the user s sleeve while the housing and tray remain under the sleeve. FIG. 12H shows the device mounted on the arm. Note that the housing (125) has a window (129) through which the display can be viewed when not ejected. FIG. 12I shows this device in use when the user's sleeve is pulled down so as to cover basically everything but the display-bearing device (127). Note that the display-bearing device can be compressed back into its tray with manual pressure, and the tray in turn can be collapsed with manual pressure back into the housing when the user wants to put the device away. Also, note that the outermost edge of the tray and the display-bearing device should be rounded and smooth so it does not hang on the user's sleeve when popping out from under it.

Figure 13:
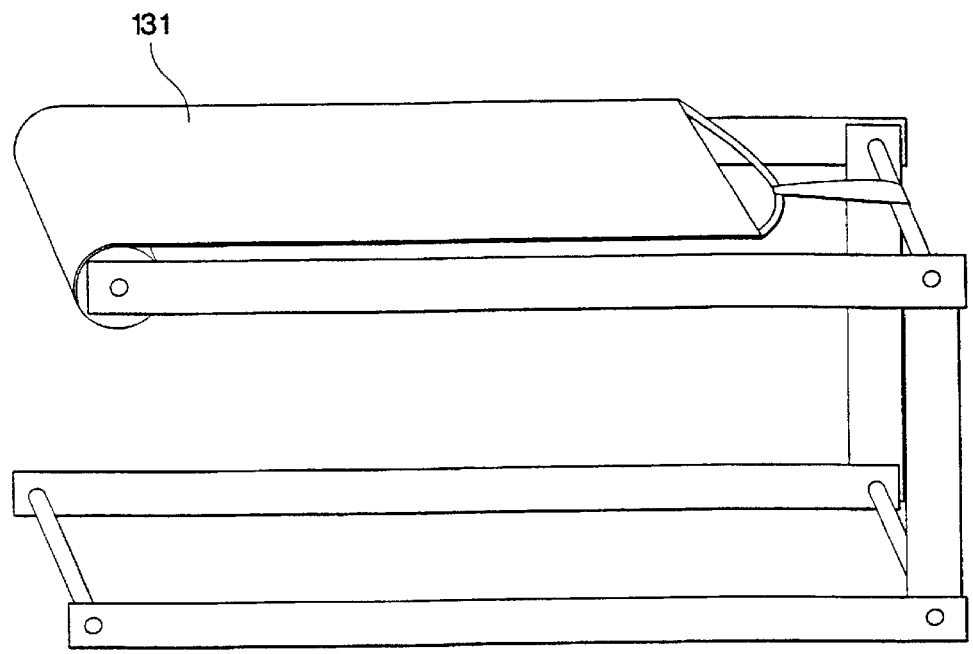
FIG. 13 shows a roll-up display ready for arm mounting.

FIG. 13 shows a roll-up display (131) ready for arm-mounting. Right now, this device is for mounting rollable paper, a projector screen or electronic fabric. It is ideally suited for mounting rollable, foldable monitors, as in the electronic paper which is still being developed currently at MIT and elsewhere.

Figure 14A:
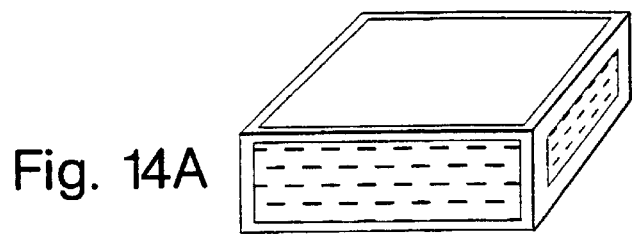
FIG. 14A shows a cage or screen computer housing.
Figure 14B:
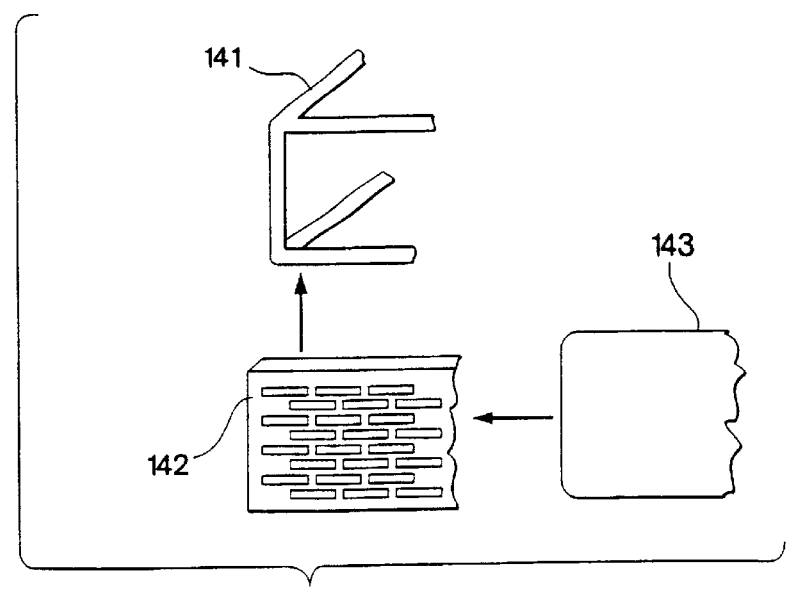
FIG. 14B shows the pieces of the cage or screen computer housing.

FIG. 14A depicts a cage or screen computer casing. Such a casing minimizes the weight of a computer. As seen in FIG. 14B, in such a mechanism, the computer casing includes a rigid frame (141) which provides most of the strength of the casing in the places where strength is most needed: the comers and edges. Upon this frame are mounted thinner, perforated rigid walls which are much lighter (142). These walls are then internally lined with a water- and dust-proof fabric (143). Such a combination protects the computer from typical blows by virtue of the rigid housing frame, from intrusion by larger, rigid objects by virtue of the walls, and from excess internal dust build-up and exposure to foreign objects by virtue of the lining.

Figure 15B:
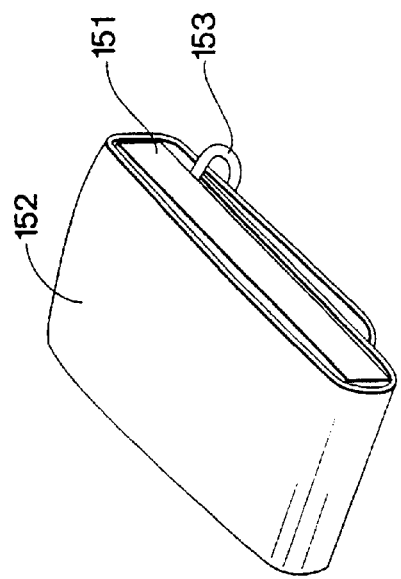
FIG. 15B shows the case position of FIG. 15A.
Figure 15A:
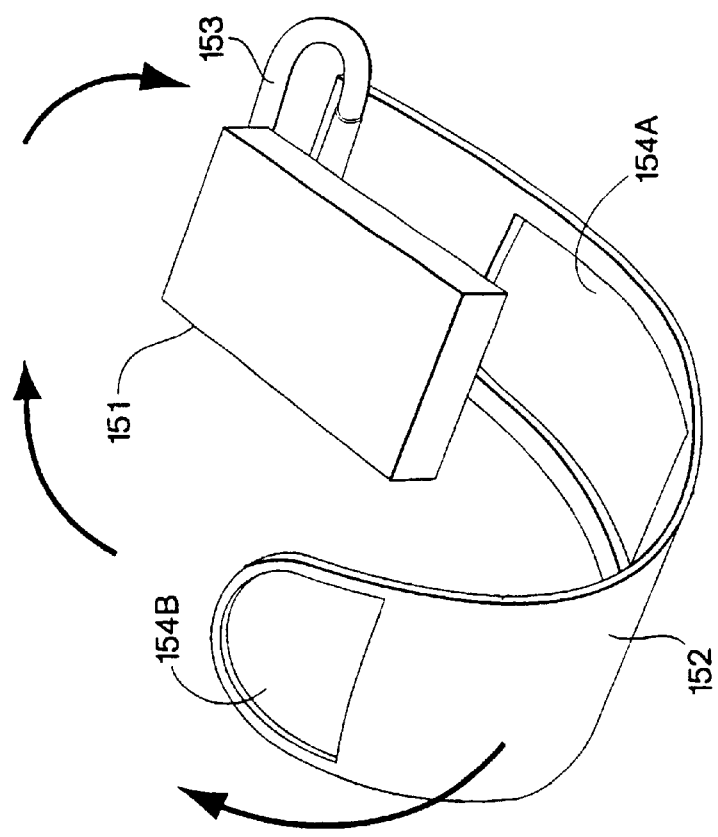
FIG. 15A shows a PDA mounted to a fold over case palette having an arm-mounting strap.

FIG. 15A depicts a typical PDA (151), specifically, a 3Com Palm Pilot, mounted upon another embodiment, hereinafter called a Fold-Over Case Palette. This Fold-Over Case Palette includes an arm-mounting strap (152), rigid plastic strap loop (153), and two patches of Velcro (154a and 154b). When the strap (152) is pulled over the face of the PDA (151), as depicted by the motion arrow, the extreme patch (154b) of Velcro fastens to a complimentary patch of Velcro on the back of the strap (154c in FIG. 16B). When in case position, the strap (152) encases the PDA (151) and the loop (153) as pictured in FIG. 15B, leaving only the side of the PDA partly exposed.

Figure 16B:
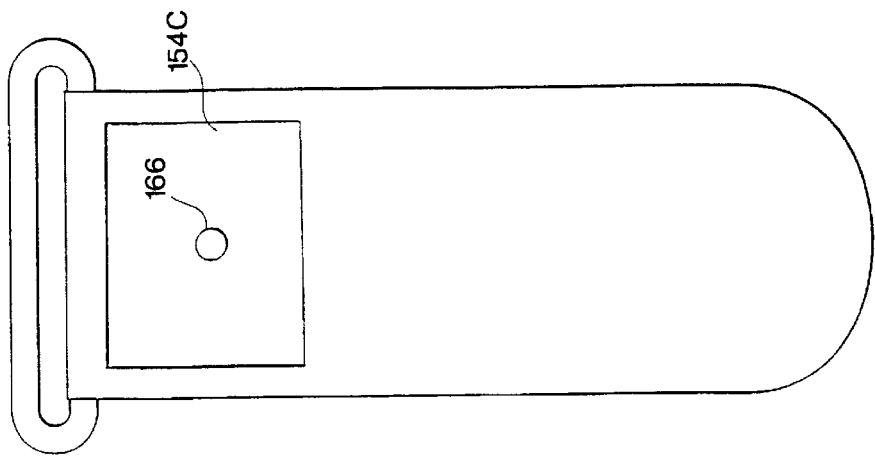
FIGS. 16A–16B show the strap of FIGS. 15A–15B in more detail.
Figure 16A:
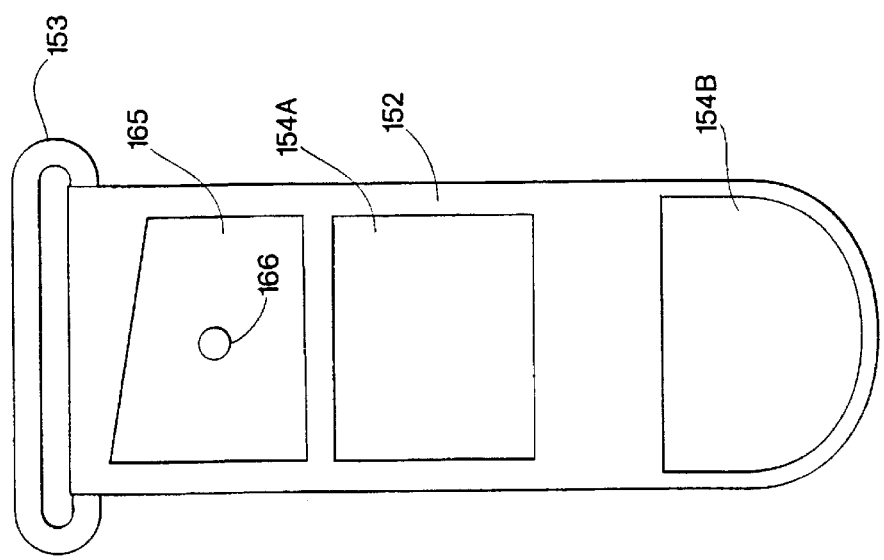

FIG. 16A presents a more detailed view of the surface of the strap (152) which faces the PDA (not pictured) when a PDA is mounted upon it. The loop (153) and two Velcro patches (154a and 154b) can be seen. Also visible is a plastic plate (165) which is also covered in Velcro. It is upon this plate (165) that the PDA (not pictured) can be mounted, provided that the back of the PDA has been equipped with a patch of complimentary Velcro. This plate (165) is attached to the arm strap (152) by a screw post (166), the head of which is visible in this illustration. FIG. 16B shows the opposite surface of the strap. The other side of the screw post (166) can be seen, as can another patch (154c) of Velcro. This patch (154c) receives the extreme patch (154b in FIG. 16A) when the strap is wrapped around the PDA as depicted in FIG. 15B.

Figure 17:
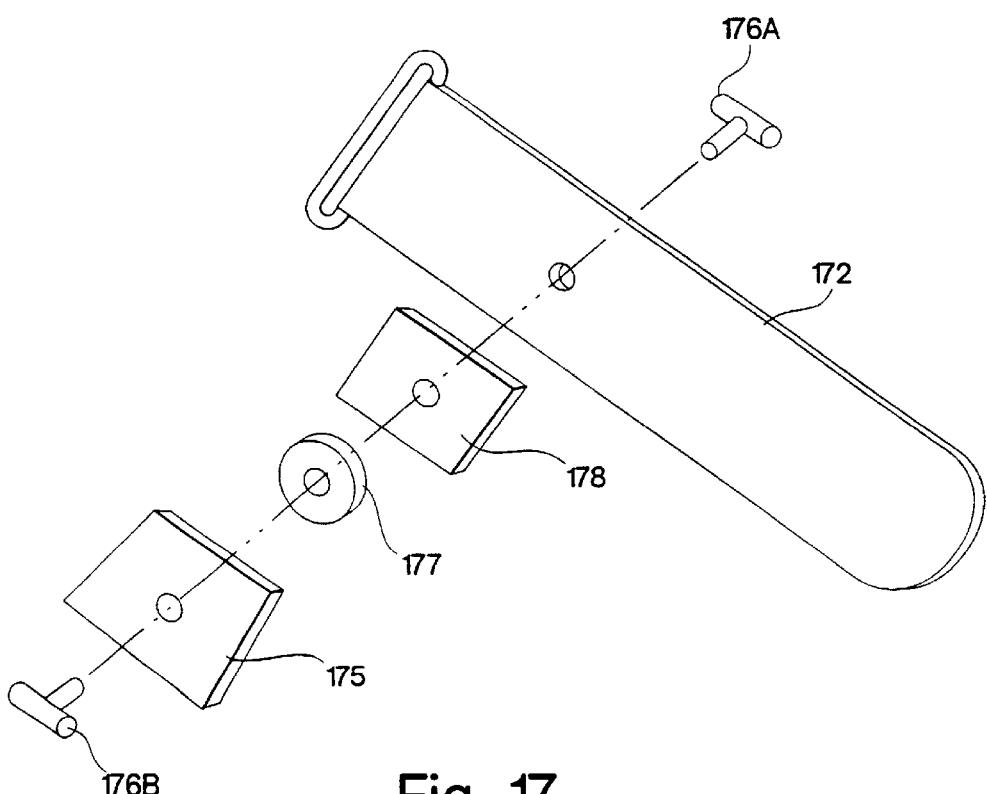
FIG. 17 shows the parts of the fold over case palette.

FIG. 17 presents a separated view of each of the parts of the Fold-Over Case Palette. The two halves of the screw post (176a and 176b) connect through holes in and hold together the following parts: the Velcro-covered plastic plate (175), a rubber grommet (177), an embedded plastic plate (178), and the arm-mounting strap (172). As described earlier, the Velcro covered plastic plate (175) is the part to which the PDA or other user-accessed device is mounted. Sandwiched between the Velcro-covered plate (175) and the embedded plastic plate (178) is the rubber grommet (177), which provides friction between the two plates (175 and 178) while also allowing them to swivel with respect to each other around the axis described by the screw post (176a and 176b) when enough torque is applied to overcome the friction between the rubber grommet (177) and the Velcro-covered plate (175). The embedded plastic plate (178) is sewn into the strap (172) so as to remain stationary with respect to the strap, and thus stationary with respect to the user's arm when the strap is being worm. Swiveling of the Velcro-covered plate (175) relative to the embedded plate (178) and strap (172) allows swiveling of the PDA with respect to the user's arm when unit is worn.

Figure 18A:
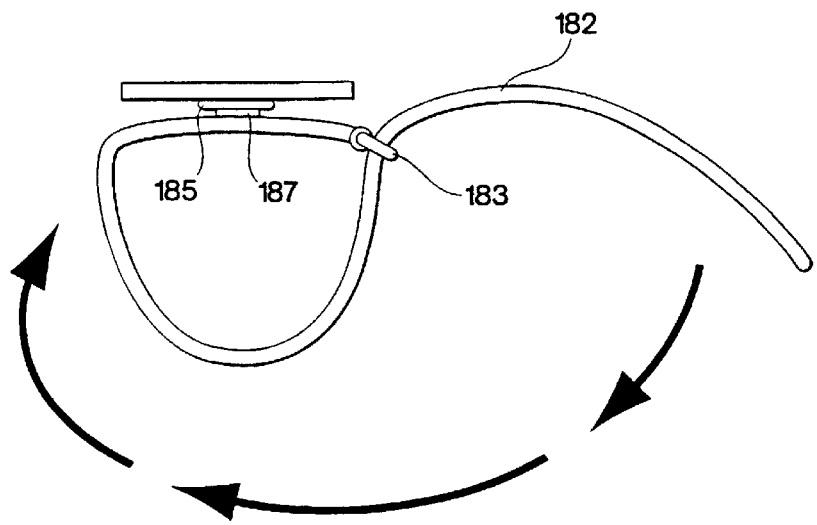
FIGS. 18A–18B show a PDA mounted to a threaded case palette.
Figure 18B:
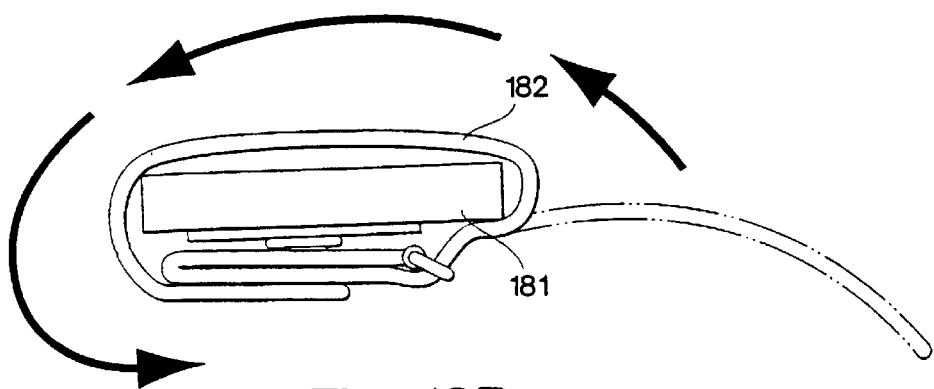

FIGS. 18A and 18B present side views of a "pre-threaded" embodiment of the invention, which will be called a Threaded Case Palette. This device provides a strap (182), a loop (183), a rubber grommet (187), and a Velcro-covered plate (185). This model, however, is designed so that the strap (182) can remain threaded through the loop (183) whether the unit is being used for its arm-mounted purpose or its case function. In arm-mounted position, slack is let out in the strap (182) to form a space (called "[arm space]" in FIG. 18A) for the user's arm to be encircled by the strap (182), as shown in FIG. 18A. Tightening of the strap once the user's arm has been inserted into the space is achieved by pulling back on the end of the strap (182) as per the arrow in FIG. 18A and attaching said strap to itself by Velcro. In case position, as shown in FIG. 18B, the slack is taken out of the strap (182) so that the arm space collapses and effectively disappears while the fold yet remains in the strap ready to expand again into an arm-space again when necessary. To finish forming a case, the strap (182) is moved from its prior position and brought over the face of the PDA (181) as per the arrow in FIG. 18B. Again the strap (182) attaches to itself by Velcro, forming a case around the PDA (181).

Note that in the Threaded Case Palette embodiment, the placement of the Velcro patches and the length of the strap will differ from those features of the Fold-Over Case Palette in accordance with the different strap-folding patterns used in these respective models.

The essential features of the inventions disclosed herein can be readily combined with other elements from prior key palettes as well. For instance, instead of an embedded plastic plate, the strap can be mounted with a sheath to house any of the various removable cantilever mechanisms depicted above. Also, a unit can be constructed so that the PDA is not removable from the arm-mounting means. In such a model, no Velcro is used to attach the PDA and the plastic mounting plate; rather the back of the PDA itself is mounted directly on the rubber grommet.

While the depicted embodiments use leather straps, other materials are contemplated, including neoprene straps and straps which are composed of several semi-rigid slats of plastic which are jointed together with a flexible material such as rubber.

The Velcro-covered, swiveling plastic plate can also be equipped with an additional plastic appendage which fits into the slot normally designed to house the Palm Pilot stylus in 3Com Palm Pilots. Resting in this slot, this appendage provides extra stability in the fastening of the Palm Pilot to the plastic plate.

Everything but the PDA itself is a kit which can be used to mount almost any PDA, palmtop computer or similarly sized device.

Substitute materials can be used, different fasteners substituted for Velcro, and modifications made to the size, shape and proportions of the various elements of the disclosed embodiments without exceeding the scope of the invention contemplated herein.

What is claimed is:

1. An arm-wearable housing for an electronic device, said housing being configured (1) to house an information display and a support mechanism such that said display faces a first direction so as to be readable to a user when worn on a user's arm and to be alternately coverable with a user's shirt sleeve and (2) to deploy said display and said support mechanism such that said display faces said first direction and can cover a portion of a user's shirt sleeve while remaining attached to said support mechanism.

2. The housing in claim 1 wherein said support mechanism comprises a collapsible/expandable member that can change in length.

3. The device in claim 2 wherein said information display comprises a telecommunication device, a personal information management device, or a user interface.

4. An apparatus for mounting an electronic device to the arm of a user, said apparatus comprising
   (1) an arm attachment means;
   (2) a display means; and
   (3) a means of movably coupling said display means to said arm attachment means such that, when the apparatus is being worn on a user's arm, said display means can be moved from a first position under a user's cuff to a second position without moving said cuff out of the way and without detaching said display means from said arm attachment means, said first position being such that said display means is between said cuff and said user's arm, and said second position being such that said cuff is between said display means and said user's arm.

5. The apparatus in claim 4 additionally comprising a telecommunication device or a personal information management device.

6. The apparatus in claim 5 wherein said display means faces away from said arm in both said first position and said second position.

7. The apparatus in claim 4 wherein said means of movably coupling comprises a collapsible/expandable support member suitable for supporting said display.

8. The apparatus in claim 7 additionally comprising a spring-loaded mechanism.

9. An apparatus for attaching a useful device to a user's forearm comprising:
   an arm-attachment means;
   a display means; and
   a support mechanism for said display means, said support mechanism being configured to move along a first line of motion, said first line being substantially parallel to said forearm, and to collapse or expand along a second line of motion, said second line being non-parallel to said forearm.

10. An apparatus for movably attaching an electronic device to a user's forearm comprising:
    an arm attachment means;
    an electronic device comprising an electronic display or user
    interface; and
    a movable coupling by which said arm attachment means is coupled to said electronic device, wherein said coupling can be manipulated by a user so that said electronic device can rest concealed under the cuff of a user's shirt sleeve when not in use and, without said user moving said cuff toward the user's elbow, said electronic device can also be moved into a position wherein the user's shirt sleeve fits in between the electronic device and the user's forearm while the electronic device is yet supported by and attached to the user's forearm.

11. An apparatus for attaching an electronic device to a user's body comprising:
    (1) a body-attachment mechanism;
    (2) a tray member, said tray member being movably coupled to said body attachment mechanism;
    (3) a collapsible support member, said collapsible support member being configured to expand and contract in length and being coupled to said tray member; and
    (4) an electronic device mounted upon said collapsible support member.

12. The device in claim 11 wherein said electronic device comprises an information display, a telecommunication device, or a personal information management device.

13. A device comprising:
    (1) an electronic device,
    (2) a housing for said electronic device,
    (3) a jointed member which on one end is moveably coupled to one end of the electronic device and on the other end is moveably coupled to the housing,
    (4) a track mechanism within the housing which allows the jointed member and the electronic device to move in and out of the housing freely while the jointed member remains moveably coupled to the housing, and
    (5) an arm-attachment mechanism.

14. The device claim 13 wherein the electronic device comprises a telecommunication device.

15. The device in claim 13 wherein the electronic device comprises an electronic display.

16. The device in claim 15 wherein the electronic device comprises a personal information management hardware device.

17. The device in claim 13 wherein the electronic device is a wireless pager.

18. A wearable support device or wearable electronic device comprising: an arm mount suitable to be worn on a user's forearm; and a cantilevered support mechanism carried by the arm mounts the support mechanism having a platform section and a riser section that carries the platform section, said riser section being collapsible and expandable in length, and said platform section being spaced apart from the arm mount such that when the arm mount is being worn, a shirt sleeve can pass between said platform section and said arm mount.

19. The device in claim 18 additionally comprising a movable coupling between said support mechanism and said arm mount.

20. The device in claim 18 wherein said platform section comprises an electronic display.

21. A wearable electronic device support or wearable electronic device comprising: an arm mount suitable to be worn on a user's forearm; and a cantilevered support mechanism carried by the arm mount, the support mechanism having a platform section and a riser section that carries the platform section, wherein the platform section is spaced apart from the arm mount such that when the arm mount is being worn, the platform section is disposed adjacent to and over the wearer's forearm, and the riser section is positioned such that a sleeve of a shirt worn by the user can pass over the arm mount between the arm mount and the platform section of the support mechanism, and wherein the riser section of the support mechanism comprises a lifting mechanism which is expandable and collapsible so that the riser section can expand and contract in length.

22. The device in claim 21 wherein said support mechanism is movably coupled to said arm mount.

23. The device in claim 21 wherein said platform section comprises a telecommunication device or personal information management (PIM) device.

24. The device in claim 21 wherein said lifting mechanism is spring-loaded.

25. The device in claim 21 additionally comprising a housing suitable for containing said cantilevered support mechanism, said housing being attached to said arm mount such that, when said cantilevered support mechanism is in said housing and said device is being worn, said housing can be covered by a user's shirt sleeve.

26. A wearable electronic device comprising:

a display;

a housing for said display;

a support member that carries said display, the support member being arranged to move back and forth within the housing to carry said display from a protected position within the housing to an exposed position outside the housing;

a collapsible mechanism for lifting said display relative to the support member when said display is in an exposed position; and an arm attachment mechanism.

27. The device in claim 21 wherein said display can be read in said protected position.

28. The device in claim 26 wherein said housing comprises a window.

29. An apparatus comprising;

a display means;

an arm-attachment means;

a means for coupling said display means to said arm-attachment means such that said display means can move parallel to a user's arm when said arm-attachment means is being worn by a user, and a collapsible lifting mechanism for lifting said display means relative to said arm-attachment means such that the space between said arm-attachment means and said display means can be expanded or contracted.

30. The apparatus in claim 29 wherein said display means comprises a flat-panel display.

31. A wrist-wearable support system, comprising:

an arm attachment mechanism;

an information display;

a housing for said display; and a support for said display, said support being configured to perform the following steps:

holding said display in a first position, wherein said display lies directly against a user's forearm so that said display can be covered with the user's shirt sleeve;

holding said display in a second position, wherein said display is disposed adjacent to and over said user's palm; and holding said display in a third position, wherein said display is disposed adjacent to and over said user's forearm and is spaced apart from said user's forearm so that a shirt sleeve can pass between said display and said user's forearm.

32. The system in claim 31 wherein said display can be read by said user in all three said positions.

\* \* \* \* \*